Jan. 23, 1934. G. O. WILMS Re. 19,062

OVERLOAD RELAY

Original Filed Aug. 8, 1928 2 Sheets-Sheet 1

Inventor
Gustav O. Wilms
By Ira Milton Jones
Attorney

Jan. 23, 1934. G. O. WILMS Re. 19,062

OVERLOAD RELAY

Original Filed Aug. 8, 1928 2 Sheets-Sheet 2

Inventor
Gustav O. Wilms
By Ira Milton Jones
Attorney

Reissued Jan. 23, 1934

Re. 19,062

UNITED STATES PATENT OFFICE 19,062

OVERLOAD RELAY

Gustav O. Wilms, Milwaukee, Wis., assignor, by mesne assignments, to Allen-Bradley Company, Milwaukee, Wis., a corporation of Wisconsin Original No. 1,844,491, dated February 9, 1932, Serial No. 298,300, August 8, 1928. Application for reissue October 30, 1933. Serial No. 695,938

1 Claim. (Cl. 200—124)

This invention relates particularly to an over-load relay of the thermally actuated type illustrated and described in my application covering thermally operated circuit breakers, filed October 15, 1927, Serial No. 226,386, and has as an object the improvement of the efficiency of such relays.

Thermal relays heretofore in use have functioned satisfactorily where the operating over-load has been sufficiently high as approximately 600% but their slow response when used with such relatively smaller over-loads as 100 to 150% due to the temperature rise being insufficient, has been extremely objectionable and this invention, therefore, contemplates as an object the provision of an improved thermal over-load relay embodying a heating element, the characteristic of which is such that its resistance increases rapidly as its temperature rises thus insuring the desired quick operation of the relay upon the occurrence of over-loads of lesser degree than that heretofore operated with.

Another object of this invention resides in the provision of an improved over-load relay of the character described in which the heating element is formed of iron or any other material having a marked positive temperature coefficient whereby its resistance rapidly increases as its temperature rises.

A further object of this invention resides in the provision of an improved over-load relay of the character described which may be readily reset in a relatively short time after the over-load occurs.

And a still further object of this invention resides in the provision of an improved over-load relay of the character described which may be conveniently enclosed in a suitable housing and which has means actuated from the exterior of the housing for resetting the device.

With the above and other objects in view which will appear as the description proceeds, my invention resides in the novel construction, combination and arrangement of parts substantially as hereinafter described and more particularly defined by the appended claim, it being understood that such changes in the precise embodiment of the hereindisclosed invention may be made as come within the scope of the claim.

In the accompanying drawings, I have illustrated one complete example of the physical embodiment of my invention constructed according to the best mode I have so far devised for the practical application of the principles thereof, and in which.

Referring now more particularly to the accompanying drawings, in which like numerals represent like parts throughout the several views, 5 designates a housing stamped from bendable metal or otherwise formed in which a base of insulating material 6 is suitably mounted and having its interior partially lined with insulating material 7.

Figure 1:
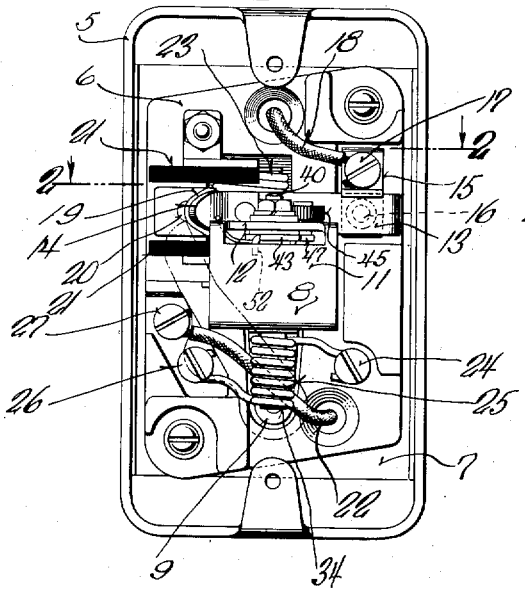
Figure 1 is a front plan view of my improved over-load relay shown with the cover of its enclosing housing removed.
Figure 2:
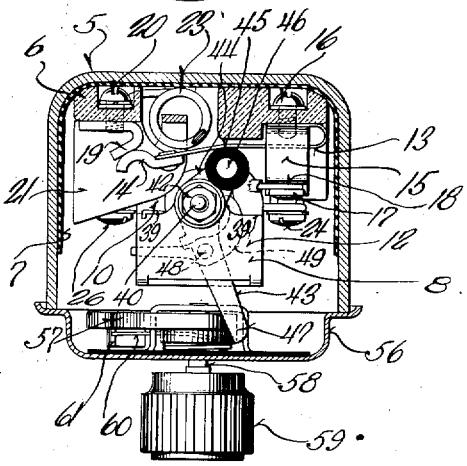
Figure 2 is a sectional view taken through Figure 1 on the plane of the line 2—2.
Figure 3:
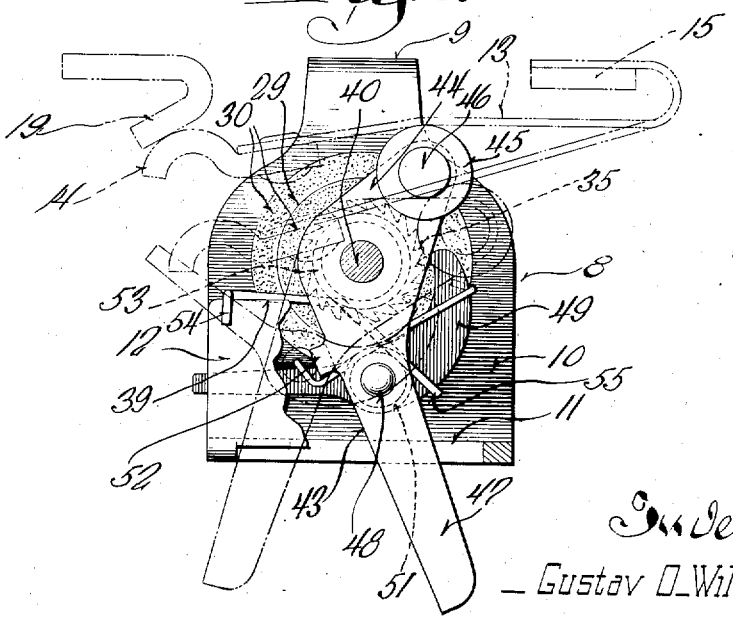
Figure 3 is a fragmentary top plan view of the over-load relay removed from its housing and with a portion thereof broken away to more clearly illustrate structural details.
Figure 4:
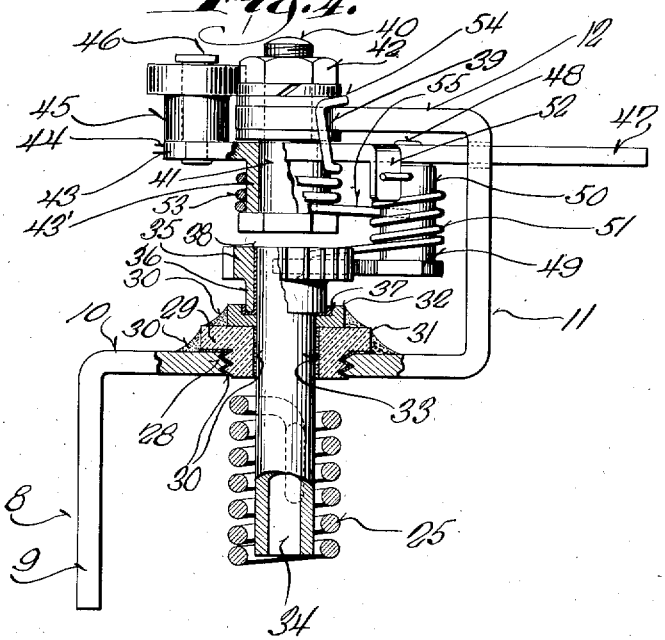
Figure 4 is an enlarged side view of the overload relay shown detached from the housing and its mounting panel with parts thereof broken away and in section.

The mechanism of the over-load relay is mounted on the base 6 and is carried by a bracket member 8 having a vertical attaching portion 9 by which it is secured to the base 6. From the upper end of the portion 9 the bracket is directed laterally, as at 10, and then upwardly, as at 11, and back again in a plane parallel to the part 10, as at 12, forming substantially a U shaped structure, the part 12 being shorter than the part 10. As illustrated in Figures 2 and 3, the vertical attaching portion 9 is of less width than that of the remainder of the bracket and the part 10 is reduced inwardly toward the narrower width of the member 9.

The bracket 8 is mounted medially on the base 6 and substantially in line with the upper part 12 thereof and carried by the base 6 is a switch member 13. The switch member 13 constitutes the movable element of a disconnecting or circuit breaking switch and is formed of a strip of yieldable conducting material having a contact 14 secured to its outer end and having its inner end bent back in substantially hairpin fashion to be impinged between the adjacent portion of the base 6 and one leg of a substantially U shaped terminal 15. A screw 16 passing through an aperture in the base 6 is threaded in the leg of the terminal 15 to connect the same therewith and the opposite leg of the terminal 15 is provided with a screw 17 by which a lead 18 entering the housing through aligned apertures therein and in the base 6, is electrically connected with the switch member 13.

The movable contact 14 cooperates with a stationary or fixed contact 19 secured on the base 6 by a screw 20 passing through an aperture in the base and threaded in the terminal, arc shields 21 being provided at each side of the contacts as is customary. The contact 19 is connected to a magnetic blow-out coil 23, one end of which is connected with the contact 19 at its attaching screw 20 and the other end with a terminal 24, at the back of the insulating base 6 by a conductor, not shown. One end of a coil of resistance wire forming a heating element 25 is secured to the terminal 24 and the other to a terminal 26 connected with a terminal 27 at the back of the base 6 by a conductor, not shown, with which the end of the lead 22 is connected.

The switch arm 13 is held in its position closing the switch by the mechanism of the relay now about to be described. The part 10 of the bracket 8 is provided with a threaded aperture 28 in which a bushing 29 formed of suitable heat resisting refractory material is loosely threaded, and the space therebetween being filled with a suitable heat resisting cement 30. The cement 30 also fills a space left between the flange 31 of the bushing 29 and the upper face of the part 10 and encircles the flange to secure the bushing onto the part 10.

A substantially cup-shaped washer 32 is positioned above the flange 31 of the bushing and is secured thereto by like cement 30, the bushing being apertured, as at 33, and having a hollow stem 34 secured in its aperture with its major portion extending below the part 10 of the bracket and its top portion extending through the aperture of the washer 32 to mount a ratchet 35.

The ratchet 35 has a downwardly projecting annular boss or flange 36 of a diameter slightly less than the diameter of the recess 37 in the washer 32 and the diameter of its opening is slightly greater than the outside diameter of the stem 34. Solder 38 or other metal of relatively low melting point fills the space between the stem 34 and the aperture of the ratchet and the recess 37 of the washer to normally secure the ratchet 35 to the stem 34. The heating element or coil 25 is wound about the downwardly projected portion of the stem 34 in close thermal relation thereto so that when an over-load occurs its heat, due to the excessive current passing therethrough, is conducted to the metal 38 which melts and frees the ratchet. This freeing of the ratchet permits means to be later described to open the switch 13 and break the circuit with which the device is used.

The heating element 25 is preferably formed of iron wire as iron has a positive temperature coefficient and its resistance when heated increases so that the device is quickly brought to a temperature at which the solder melts to permit opening of the switch 13.

The upper part 12 of the bracket is apertured in axial alignment with the threaded aperture 28 of part 10 and that portion adjacent the aperture is reduced in width to form shoulders 39 extending to each side of the frame as best illustrated in Figure 2. A stud 40 having a bearing portion 41 is secured in the aperture of the part 12 of the bracket by a nut 42 and the bearing portion 41 thereof extends below the bracket part 12 and through a bushing 43′ on a switch arm actuating lever 43 to medially pivotally mount the lever, the inner arm 44 thereof being provided with a roller 45 of insulating material pivotally mounted thereon by a stud 46. The roller 45 engages the switch arm 13 to maintain the same in its closed position.

The outer arm 47 of the lever 43 has a stud 48 secured thereto at a point spaced from its pivotal mounting 41 to provide means for mounting a pawl 49, the pawl having a bushing 50 secured thereto in which the stud 48 is positioned. The pawl 49 is arranged to engage the teeth of the ratchet 35 and is yieldably urged to such engagement by a pawl spring 51 having one end engaging the outer edge of the pawl and being medially coiled about the bushing 50 and having its other end engaging a stop 52 extended downwardly from the arm 47. Thus, as the arm 47 is swung about its pivot 41 to move the roller 45 into engagement with the switch arm 13 to close the contacts 14 and 19, the pawl 49 moves over the teeth of the ratchet 35 and engages the tooth nearest its limit of movement to maintain the parts in said adjusted position as long as the current flowing through the circuit with which the device is used is within a predetermined value.

A spring 53, having its medial portion coiled about the bushing 43′ of the lever 43 and having one end 54 hooked behind one shoulder 39 of the part 12 of the bracket with its other end 55 engaging the bushing 50, normally yieldably urges the lever 43 toward inactive position, tending at all times to produce rotation of the ratchet 35 on the stem 34 to permit the roller 45 to move away from the switch arm 13, to a position illustrated in dotted lines in Figure 3.

As long as the circuit is operating under normal conditions the parts maintain their operative positions but when an over-load occurs, the heating element 25 heats the stem 34 to melt the solder and thus free spring 53 to turn the ratchet 35 and permit the lever 43 to assume its dotted line position shown in Figure 3, breaking the circuit at the contacts 14 and 19. As the circuit is thus broken, the element 25 quickly cools and the solder again sets and secures the ratchet 35 to the stem 34. Resetting of the device is then accomplished by moving the arm 47 of lever 43 to move the switch arm 13 to its closed position where it is held by the engagement of the pawl 39 with one of the teeth of the ratchet 35.

A cover 56 suitably secured to the housing completely encloses the device and a resetting lever 57 having a stud 58 extending outwardly through the cover and with an actuating knob 59 positioned thereon provides means for moving the arm 47 of the lever 43 to the right with respect to Figure 2 to reset the mechanism. The arm 57 is normally held in its inactive position by a spring 60 coiled about the stud 58 and having one end engaging a projection 61 carried by the arm.

Figure 5:
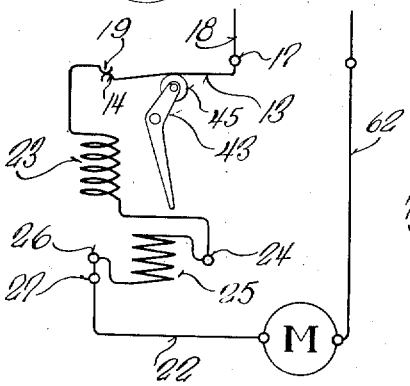
Figure 5 is a diagrammatic view illustrating my improved relay incorporated in a simple motor circuit.

In Figure 5 is illustrated diagrammatically a simple motor circuit in which the over-load relay described is incorporated. This circuit includes the lead 18, terminal 17, switch arm 13, and its contact 14 which is normally engaged with the contact 19 being held in this position by the switch arm actuating lever 43. As above described the contact 19 is connected with a terminal 24 through a magnetic blow-out coil 23 and the terminal 24 has one end of the resistance element 25 connected thereto, the other end thereof being connected with a terminal 26. From the terminal 26 the circuit extends to the terminal 27 and then to the motor "M" through the lead 22 and from the other side of the motor "M" a conductor 62 connects with the other side of the source of supply.

Figure 6:
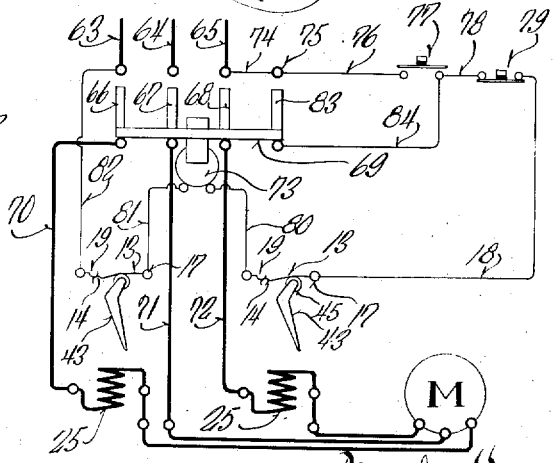
Figure 6 is a diagrammatic view illustrating the over-load relay as applied to a three phase starting system for motors.

In Figure 6 two over-load relays are included in the control circuit of an automatic motor starting switch which includes lead-in conductors 63, 64 and 65 which connect with contacts adapted to be engaged with the switch arms 66, 67 and 68 of a magnetically actuated switch 69 to close the circuit of its motor "M" through conductors 70, 71 and 72. The heating elements 25 in this instance are inserted in series with the conductor 70 and the conductor 72.

The switch 69 is closed by energization of a solenoid coil 73, the circuit of which extends from the lead-in conductor 65, through a conductor 74 to a terminal 75, conductor 76 to one side of a starting switch 77 from the other side thereof through a conductor 78 to one side of a stopping switch 79 from the other side thereof through the lead 18 to terminal 17. From the terminal 17, the circuit continues through the switch 13, contacts 14 and 19, through a conductor 80 to one side of the solenoid coil 73, through the coil, through a conductor 81, through the second switch 13, its contacts 14 and 19 and through a conductor 82 to the side 63 of the line. Initial closing of the starting switch 77 energizes the coil 73 which closes the switch 69 thus bridging the control circuit at the contact 75 through switch arm 83 which is connected with the far side of the starting switch 77, by a conductor 84 thus maintaining the control circuit closed until manual opening thereof by actuation of the stopping switch 79 or by opening of the switch 13 of either over-load relay.

From the foregoing description taken in connection with the accompanying drawings, it will be readily apparent to those skilled in the art to which an invention of this character appertains that I provide an over-load relay which is simple in construction, which permits ready resetting thereof and one in which the heating element is formed of material having a positive temperature coefficient and in which the resistance thereof builds up as its heat increases.

What I claim as my invention is:

In an overload relay of the character described, a circuit closure normally yieldably urged to one position, a mounting member, an actuating member carried thereby and adapted to hold the circuit closure in its other position, a tubular stem carried by said mounting member, a locking member on said tubular stem, thermally responsive means normally securing the locking member fixed to the stem, means connecting the actuating member with the locking member to normally maintain the actuating member in its position urging the circuit closure to said other position, and a heating coil surrounding the stem whereby an increase in temperature of the coil is readily conducted to the thermally responsive means securing the locking member in fixed position through the tubular stem to free the locking member and permit the actuating member to move to a position releasing the circuit closure for movement to its first-mentioned position.

GUSTAV O. WILMS.